Feb. 20, 1951      H. E. LUEBBERS      2,542,150
HAY STACKER
Filed Oct. 29, 1949      2 Sheets-Sheet 1
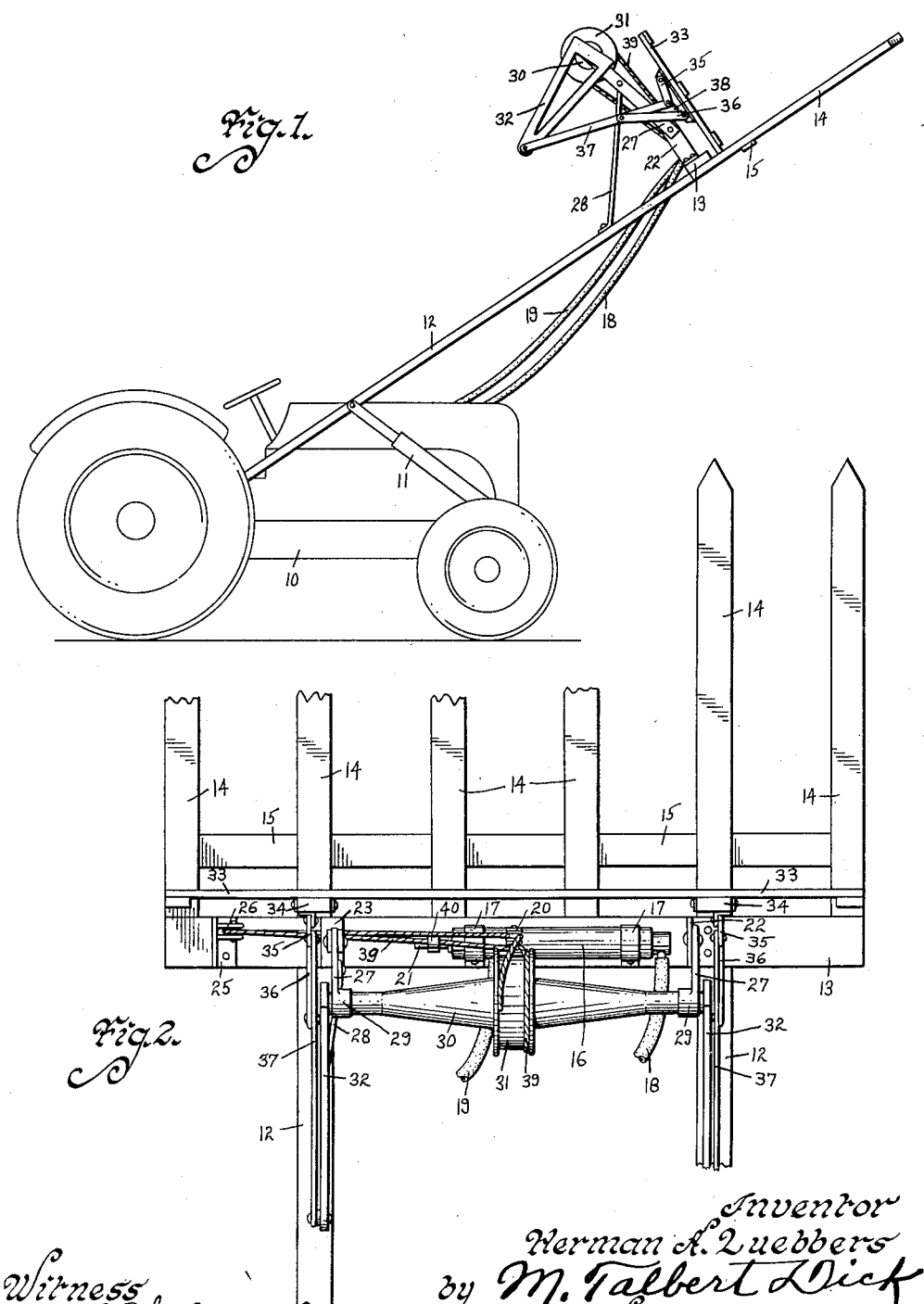

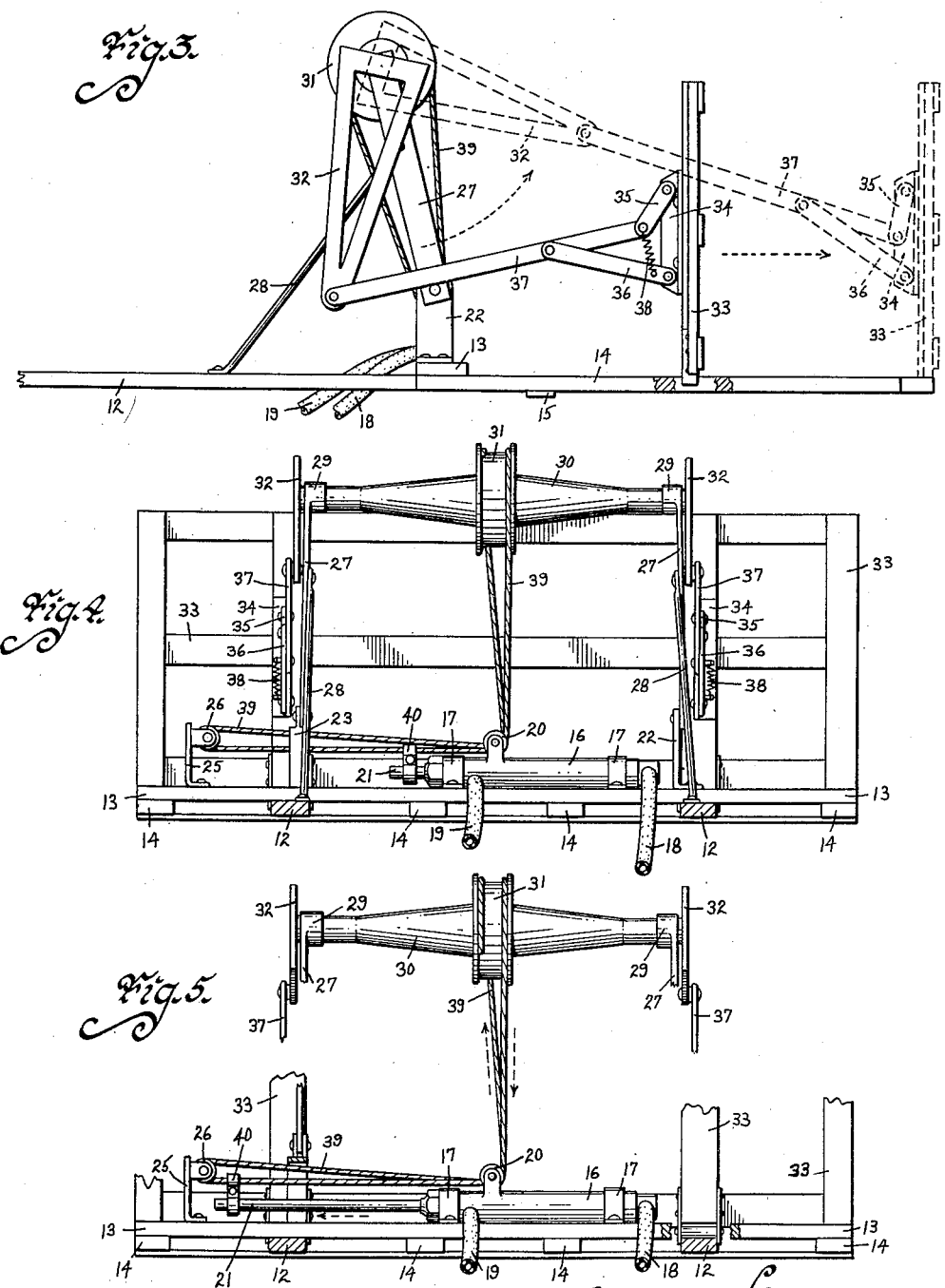

Patented Feb. 20, 1951

2,542,150

UNITED STATES PATENT OFFICE 2,542,150

HAY STACKER

Herman E. Luebbers, Fort Dodge, Iowa

Application October 29, 1949, Serial No. 124,290

6 Claims. (Cl. 214—82)

My invention relates to a hay stacking device and more particularly to such a device arranged on a tractor and hydraulically operated in such a manner that hay is pushed off the end of the stacker instead of dropped off.

Hay stackers generally are provided with a hinged end portion so that after a load of hay is scooped up and the stacker elevated and positioned over the point where it is to be stacked or over a partially completed stack, the end hinged portion can be dropped downwardly thus causing the hay to slide off by gravity. Obviously, the height to which such a device is capable of stacking the hay is limited by the height of the outer end of the hinged portion at some point below its horizontal plane. This is true for the reason that if the hinged portion cannot drop below the horizontal the hay load will not slide off. Consequently, the height to which any given stacker can elevate the hay load with the hinged end portion in locked position is greater than the height of the stack that can be made by substantially the distance corresponding to the length of the hinged end portion.

It is therefore one of the objects of my invention to provide a hay stacker capable of pushing a load off the end thereof and thereby on any given stacker being able to stack the hay to the same height to which it can be elevated by the stacker.

A further object of this invention is to provide a hydraulically operated hay stacker of the push-off type that is adaptable for use on tractors or the like having a hydraulic power mechanism.

Still further objects of this invention are to provide a push-off type haystacker that can easily and quickly be attached or detached to or from a tractor, that is economical in manufacture, efficient in operation and durable in construction.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a side view of my device shown attached to a tractor and showing the push-off gate in its rearwardly position, Fig. 2 is a top view of the operating mechanism of this device and showing fragmentary portions of associated parts to more fully illustrate its construction, Fig. 3 is a side view of this device showing the push-off gate somewhat forward of its rearwardly position with the dotted lines indicating the foremost forwardly position thereof, Fig. 4 is a rear view of the operating mechanism and gate of this device showing the plunger rod of a hydraulic mechanism in retracted position, and Fig. 5 is a fragmentary rear view of the operating mechanism of this device showing its association with a hydraulic mechanism having its plunger rod in extended position.

Referring to the drawings I have used the numeral 10 to designate a tractor having a pair of hydraulic lift mechanisms 11 of which only one is shown. To such a vehicle I attach my hay stacker. The numeral 12 designates two spaced apart elongated beam members, each hingably secured at its rear end to one side respectively of the tractor frame in a manner not shown but customary for devices of this character. Thus arranged the beams 12 are astraddle the tractor and extend forwardly like tongues on a wagon. Each of the beams 12 are secured to one of the hydraulic lifts 11, as shown in Fig. 1, which can be controlled by the tractor operator to raise or lower the beams. Transversely arranged on and secured to the front end of the beams 12 is a cross-beam 13 which projects outwardly from each beam 12, as shown in Fig. 2. The numeral 14 designates a plurality of spaced apart tine members secured at their respective rear ends to the underside of the cross-beam 13 and extending forwardly transversely to the longitudinal axis thereof. A support brace 15 is transversely secured to the underside of the tines 14 and is parallel to and slightly spaced apart from the cross-beam 13.

A third hydraulic mechanism 16 is secured to the top center portion of the cross-beam 13 by any suitable means such as the brackets 17. The mechanism 16 is provided with the actuating conduits 18 and 19, the pulley wheel 20 and the plunger rod 21 that is actuated by hydraulic pressure from the conduits 18 and 19. The numeral 22 designates an L-shaped bar support member secured to the cross-beam 13 on the right side thereof, as shown in Fig. 4 and the numeral 23 designates an open center rectangular bar support member secured to the left side of the cross-beam 13 as shown also in Fig. 4.

The numeral 25 designates an L-shaped bracket member provided with the pulley wheel 26 which is secured to the cross-beam 13 between the support bar 23 and the left end portion of the cross-beam as shown in Fig. 4.

The numeral 27 designates two elongated spaced apart bar brace members vertically arranged so that their bottom ends are secured to the support members 22 and 23 respectively, and each of these brace members 27 are slightly inclined rearwardly. Support rod braces 28 are each secured at one end to one of the support members 27 and at their other respective end to one of the beams 12 and serve to keep the bar support members 27 steady and in position as illustrated in Fig. 1 and Fig. 3. On the upper end of each bar support member 27 there is secured a bearing member 29.

The numeral 30 designates a shaft member provided with the centrally positioned reel member 31. This shaft is rotatably arranged in the bearing members 29, as shown in Fig. 4 and is formed so that its respective end portions are smaller in diameter than the center portion thereof. The numeral 32 designates two crank arms secured respectively to the right and left end of the shaft 30, as shown in Fig. 3 and Fig. 4. Each arm 32 is formed in the shape of a triangle with one short side and two longer sides that are of equal length. It is on the short side of the respective arms that it is secured to the respective ends of the shaft 30. The numeral 33 designates a gate member formed by a plurality of horizontally spaced apart beam members secured together by a plurality of vertically spaced apart beam members.

The numeral 34 designates two bearing plate members each secured to the rear side of one of the vertical beam members of the gate 33, as shown in Fig. 4. Each of these plate members has a link member 35 pivotally secured to its upper portion and a link member 36 pivotally secured to its lower portion with the links 36 being of greater length than the links 35.

The numeral 37 designates two elongated link members each respectively pivotally secured at one end to the free end of one of the links 35 and pivotally secured at their other respective ends to the lower free apex of one of the crank arms 32, as shown in Fig. 3. The free end of each link member 36 is pivotally secured to one of the links 37 at a point slightly forward of the center portion thereof. Thus arranged, the gate 33 is held vertically in place over the tines 14, as shown in Fig. 1 and Fig. 3.

A coil spring 38 is provided for each group of links 35—37 and is secured at one end to the link 35 and at its other end to the link 36, as shown in Fig. 3.

The numeral 39 designates a cable that has its two end portions extending around and fastened to the reel drum 31 from opposite directions and its length around the pulley wheel 26 and along one side of the pulley wheel 20, as shown in Fig. 5. The numeral 40 designates a bracket member secured at one end to the free end of the plunger rod 21 and secured at its other end to one strand of the cable 39.

When this hay stacking device is constructed and arranged as described, it will operate in the following manner:

To pick up a load of hay the gate 33 is brought to its rearwardly position, as shown in Fig. 1. This is accomplished by the operation of the standard hydraulic mechanism so that pressure through conduit 19 forces the plunger rod 21 to the right which is its retracted position. Since the bracket 40 is secured to both the end of the plunger rod 21 and to one strand of the cable 39, the movement of the rod 21 will likewise move the cable 39 and this is arranged so that movement of the rod 21 and the resulting movement of the cable 39 will cause the reel 31 to rotate toward the front. This forward rotation of the reel 31 causes the triangular crank arms 32 to move toward the rear which in turn will pull the gate 33 rearwardly because of the arrangements of the links 35—37, as illustrated. With the gate thus positioned, this device can be lowered by the lifts 11 so that the end of the tines 14 are in the desired position. A forward motion of the tractor will scoop a load of hay onto the tines and as this device is then elevated by means of the lifts 11, the hay load will slide back against the gate 33.

When the elevated load is positioned over the point where it is to be stacked, pressure through conduit 18 is applied which acts upon the plunger rod 21 to move it to the left to its extended position. In this operation the shape of the opened center support bar 23 is apparent as the cable 39 and rod 21 both pass through this support as illustrated. As the rod 21 moves to its extended position the cable 39 also moves as described above and causes the reel 31 to rotate rearwardly.

This rotation moves the crank arms 32 to the front with the result that the arrangement of the links 35—37 to the crank arm 32 and bearing plate 34 will push the gate 33 toward the end of the tines 14, thus discharging the hay load and making it possible to make a hay stack as high as the point to which the end of the tines can be elevated.

One of the novel features of this device is that regardless of the position of the crank arms 32, the gate will be maintained at approximately a right angle to the fork. This is made possible by the connecting linkage. The small links 35 and medium links 36 have their forward ends pivoted to the bearings 34 respectively. The links 37 have their forward ends connected to the rear ends of the upper small links 35 respectively, but the medium links have their rear ends pivoted to the center lengths of the arms 37. The springs 38 yieldingly hold the forward ends of the links 37 and rear ends of the small links 35 downwardly. By this arrangement, as the arms 32 move forwardly, the links will move to extend forwardly and downwardly, the short links 35 almost downwardly, and the links 36 at a steeper angle forwardly and downwardly. This first one half return movement of the arms actuates the links oppositely, thus maintaining the vertical position of the gate as it slides forwardly or rearwardly on the fork. The hydraulic operating means 16, 18, 19, and 21 is standard equipment and common to the art. The conduits 18 and 19 are connected to the tractor hydraulic pump and controlled in the usual manner.

Some changes may be made in the construction and arrangement of my hay stacker without departing from the real spirit and purpose of my invention, and it is my intention to cover by my claims, any modified forms of structure or use of mechanical equivalents which may be reasonably included within their scope.

I claim:

1. In combination with a tined hay fork having a frame, an unloading means, comprising, a gate slidably mounted above the tines of said fork, a shaft journaled on said frame, an arm on said shaft, a bearing member on said gate, a short link having one end pivoted to said bearing member, an elongated link pivoted at one end to said arm and its other end pivoted to the other end of said short link, a third link having one end pivoted to said bearing member at a point below said short link and its other end pivoted to the central portion of said elongated link, a spring means extending between the rearmost end of the short link and said third link, and a means for rotating said shaft in either direction.

2. In combination with a tined hay fork having a frame, an unloading means, comprising, a gate slidably mounted above the tines of said fork, a shaft journaled on said frame, an arm on said shaft, a bearing member on said gate, a short link having one end pivoted to said bearing member, an elongated link pivoted at one end to said arm and its other end pivoted to the other end of said short link, a third link having one end pivoted to said bearing member at a point below said short link and its other end pivoted to the central portion of said elongated link, a spring means extending between the rearmost end of the short link and said third link, and a hydraulic prime mover for rotating said shaft in either direction.

3. In combination with a tined hay fork having a frame, an unloading means, comprising, a gate slidably mounted above the tines of said fork, a shaft journaled on said frame, an arm on said shaft, a bearing member on said gate, a short link having one end pivoted to said bearing member, an elongated link pivoted at one end to said arm and its other end pivoted to the other end of said short link, a third link having one end pivoted to said bearing member at a point below said short link and its other end pivoted to the central portion of said elongated link, a spring means extending between the rearmost end of the short link and said third link, a hydraulic lift on said frame having a reciprocating shaft, a drum on said first-mentioned shaft, a pulley wheel on said frame, a cable having its length extending around said pulley wheel and its two end portions around and secured to said drum from opposite directions, and a means for connecting said hydraulic reciprocating shaft to said cable.

4. In a hay stacking device designed for use on a tractor having a source of fluid pressure, two elongated beam members respectively hingably secured at their rear end to opposite sides of the chassis of said tractor at the rearwardly portion thereof so that said beams are astraddle said tractor chassis and extend forwardly therefrom, a cross-beam member transversely secured to the forward ends of said first mentioned beam members, a plurality of tine members secured to and extending forwardly from said cross-beam, two spaced apart support bars vertically secured on said cross-beam, a support bar brace vertically secured to each of said support bars, a bearing member on the top of each of said support bar braces, a shaft rotatably arranged in said bearing members, a reel member centrally positioned on said shaft member, a crank arm secured at each end of said shaft, a hydraulic mechanism having an extending and retracting plunger rod horizontally arranged on said cross-beam, a support bar provided with a pulley wheel secured to said cross-beam, a pulley wheel secured to said hydraulic mechanism, an endless cable arranged around said reel, said pulley wheel on said bar support and engaging said pulley wheel on said hydraulic mechanism; said cable secured to the free end of said plunger rod so that movement of said rod will move said cable so as to rotate said reel, a gate member vertically arranged on and horizontally movable over said tine members; said gate members operatively associated with said crank arms so as to be capable of moving from the rear of said tines to the front thereof at times and from front to rear at times, and said device designed to be capable of being raised or lowered by means of a hydraulic lift attached to said tractor.

5. In a device of the class described, a cross-beam member designed to be secured near the end of a hay stacker, a hydraulic mechanism having an extending and retracting plunger rod horizontally arranged on said cross-beam; said mechanism designed to be operated by a source of fluid pressure, two support bars secured to said cross-beam in spaced relation, a support bar brace vertically secured to each of said support bars, a bearing member on the top of each support bar brace, a shaft rotatably arranged in said bearing members, a reel member centrally positioned on said shaft, an endless cable arranged around said reel and operatively connected to said plunger rod whereby movement of said plunger rod will rotate said reel, a crank arm secured to each end of said shaft, a gate member designed to be vertically positioned on and horizontally movable over the end portion of a hay stacker; said gate member operatively associated with sand crank arms so that forward or rearward movement of said crank arms will cause a corresponding forward or rear movement of said gate member.

6. In a device of the class described, a cross-beam member designed to be secured near the end of a hay stacker, a hydraulic mechanism having an extending and retracting plunger rod horizontally arranged on said cross-beam; said mechanism designed to be operated by a source of fluid pressure, a pulley wheel secured to said hydraulic mechanism, two support bars secured to said cross-beam in spaced relation with at least one of said support bars provided with a pulley wheel, a support bar brace vertically secured to each of said support bars, a bearing member on the top of each support bar brace, a shaft rotatably arranged in said bearing members, a reel member centrally positioned on said shaft, an endless cable arranged around said reel, said pulley wheel on one of said support bars and engaging said pulley wheel on said hydraulic mechanism; said cable secured to said plunger so that movement of said rod will rotate said reel, a crank arm secured to each end of said shaft, a gate member designed to be vertically positioned on and horizontally movable over the end portion of a hay stacker; two spaced apart bearing members secured to said gate, two link members pivotally secured to each of said bearing members in vertical spaced relation; each of said upper links being shorter than said lower links, two elongated link members respectively pivotally secured at one end to one of said crank arms respectively and at the other end one of said upper link members with each of said lower link members being pivotally secured to a portion of one of said elongated links, two coil spring members respectively secured to one of said upper link members and one of said lower link members; said arrangement of link members providing the means whereby the forward or rear movement of said crank arm will cause a corresponding forward or rear movement of said gate member in such a manner that said gate member when in motion will remain perpendicular to the bottom portion of the hay stacker over which it moves.

HERMAN E. LUEBBERS.

REFERENCES CITED

The following references are of record in the file of this patent:

UNITED STATES PATENTS

| Number | Name | Date |
|---|---|---|
| 2,418,661 | Palm | Apr. 8, 1947 |
| 2,448,631 | Selak | Sept. 7, 1948 |
| 2,485,110 | Pokorny | Oct. 18, 1949 |